(12) United States Patent
Rostand et al.

(10) Patent No.: US 10,534,961 B2
(45) Date of Patent: Jan. 14, 2020

(54) METHOD, DEVICE AND PERMANENT STORAGE MEMORY FOR DETECTING DRILLING AND/OR HYDRAULIC FRACTURING OF HYDROCARBON WELLS

(71) Applicant: KAYRROS, Paris (FR)

(72) Inventors: Antoine Rostand, Paris (FR); Ivaylo Petkantchin, Paris (FR); Axel Davy, Paris (FR); Carlo De Franchis, Paris (FR); Jean-Michel Morel, Paris (FR); Sylvain Calisti, Paris (FR)

(73) Assignee: KAYRROS, Paris (FR)

( * ) Notice: Subject to any disclaimer, the term of this patent is extended or adjusted under 35 U.S.C. 154(b) by 123 days.

(21) Appl. No.: 15/812,700

(22) Filed: Nov. 14, 2017

(65) Prior Publication Data

US 2018/0137355 A1    May 17, 2018

Related U.S. Application Data

(60) Provisional application No. 62/423,106, filed on Nov. 16, 2016, provisional application No. 62/451,466, filed on Jan. 27, 2017.

(51) Int. Cl.
*G06K 9/00* (2006.01)
*G06N 3/04* (2006.01)
*G06N 3/08* (2006.01)

(52) U.S. Cl.
CPC ......... *G06K 9/00637* (2013.01); *G06N 3/04* (2013.01); *G06N 3/08* (2013.01)

(58) Field of Classification Search
CPC ............... G06F 17/40; G06F 11/30; G06K 2009/00738; G06K 9/00637; G06K 9/00711
See application file for complete search history.

(56) References Cited

U.S. PATENT DOCUMENTS

| | | | |
|---|---|---|---|
| 8,838,390 B1 * | 9/2014 | Selman | E21B 44/00 166/264 |
| 2002/0161685 A1 * | 10/2002 | Dwinnell | G06Q 40/04 705/36 R |
| 2010/0114493 A1 * | 5/2010 | Vestal | E21B 41/00 702/9 |
| 2010/0250139 A1 * | 9/2010 | Hobbs | E21B 47/12 702/6 |

(Continued)

*Primary Examiner* — Li Liu
(74) *Attorney, Agent, or Firm* — Sunit Talapatra; Foley & Lardner LLP

(57) ABSTRACT

A method for detecting pad construction and/or drilling and/or for hydraulic fracturing of at least one hydrocarbon well, comprising the steps of: selecting at least one specified well location, obtaining at least one time series of top view images of the specified well location, in which each top view image has a date corresponding to a day of acquisition of the top view image, processing the time series of top view images to detect at least one top view image showing the apparition of a well pad and/or showing drilling activity and/or showing fracturing activity, exporting the date corresponding to the acquisition day of the top view image showing the apparition of the well pad and/or drilling activity and/or fracturing activity, providing, based on export date, an information of pad construction date and/or drilling starting date and/or fracturing starting date and/or a full production forecast for the specified well location.

26 Claims, 9 Drawing Sheets

(56) References Cited

U.S. PATENT DOCUMENTS

| | | | | |
|---|---|---|---|---|
| 2012/0143899 A1* | 6/2012 | Arango | E21B 49/00 | 707/769 |
| 2015/0354349 A1* | 12/2015 | Sauders | E21B 47/122 | 340/853.1 |
| 2016/0053604 A1* | 2/2016 | Abbassian | E21B 44/00 | 702/6 |
| 2016/0098174 A1* | 4/2016 | Anghelescu | E21B 41/00 | 715/738 |
| 2016/0108715 A1* | 4/2016 | Haines | E21B 41/00 | 348/85 |
| 2018/0038689 A1* | 2/2018 | Takemura | G01C 3/06 | |
| 2018/0274334 A1* | 9/2018 | Fuchs | E21B 41/0057 | |
| 2019/0018871 A1* | 1/2019 | Zheng | G06F 16/2455 | |

\* cited by examiner

WP

WP

FIG. 6A    FIG. 6B    FIG. 6C
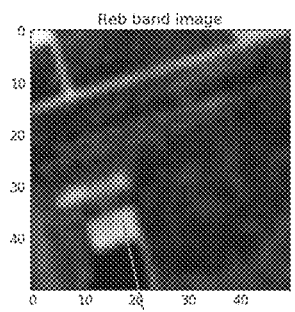 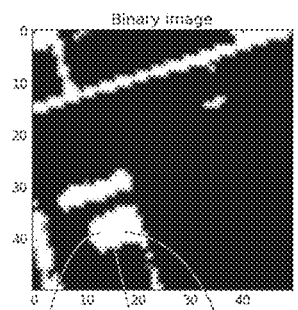 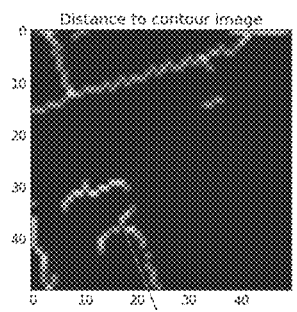
WP    Z, WP    C
B    C
FIG. 6D    FIG. 6E
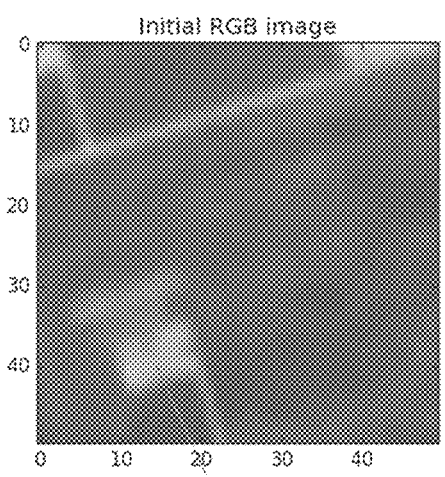 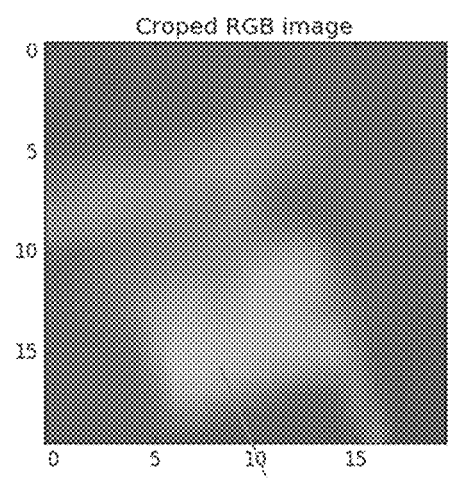
WP    WP FIG. 7A    FIG. 7B    FIG. 7C
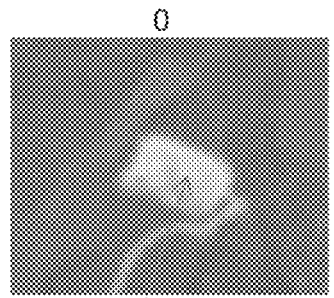 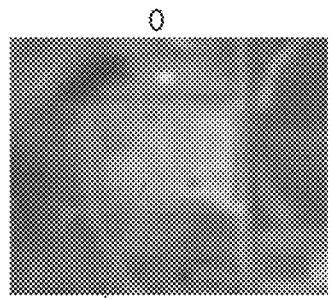 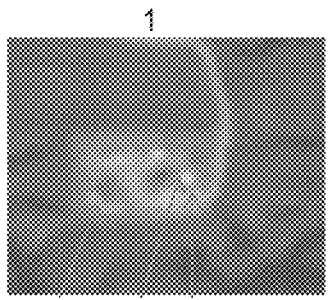
WP    WP    WP    OBJ    OBJ
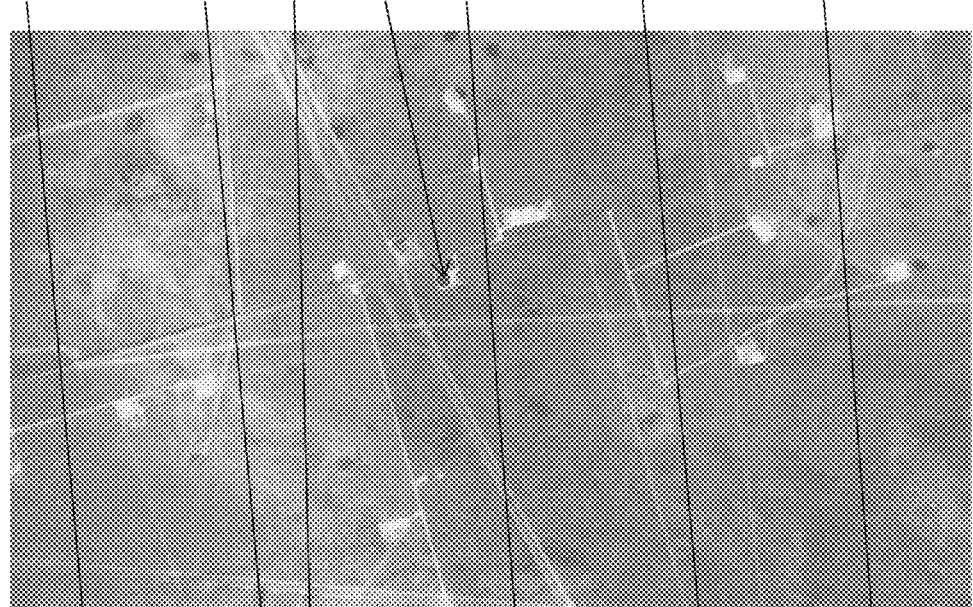
FIG. 15

US 10,534,961 B2

METHOD, DEVICE AND PERMANENT STORAGE MEMORY FOR DETECTING DRILLING AND/OR HYDRAULIC FRACTURING OF HYDROCARBON WELLS

CROSS-REFERENCE TO RELATED APPLICATIONS

The present application claims priority to U.S. Provisional Patent Application No. 62/423,106 filed on Nov. 16, 2016, the entire disclosure of which is incorporated herein by reference.

The present application also claims priority to U.S. Provisional Patent Application No. 62/451,466 filed on Jan. 27, 2017, the entire disclosure of which is incorporated herein by reference.

BACKGROUND OF THE INVENTION

The invention concerns a method and device for detecting pad construction and/or drilling and/or hydraulic fracturing of hydrocarbon wells.

The invention generally applies to oil wells and/or gas wells.

Prior to production, several steps are required to bring a well online. In the USA, a permit for drilling must be issued first. This permit gives the operator permission to drill at a certain place before an expiration date. In order to proceed with the subsequent steps, a "well pad" is then constructed at the location of the permit to enable for the use of heavy machinery. A rig in then mobilized on the well pad to proceed with the drilling of the well. Otherwise, for unconventional wells, there is an additional hydraulic fracturing (fracking) step. Both drilling and fracking activity have a timescale of a few days to several weeks and involve heavy machinery.

Thus, knowing exactly when a well is drilled or fracked is a key factor to estimate its production time series. However almost all official databases containing the reports of drilling and fracking activity are lagged. This lag can sometimes exceed a year for some wells.

SUMMARY OF THE INVENTION

The goal of the invention is to obtain a method and apparatus for detecting drilling and/or hydraulic fracturing of hydrocarbon wells, with a significantly lower lag using images to detect drilling or fracking activity.

According to one aspect of the invention, there is provided a method for detecting pad construction for at least one hydrocarbon well and/or for detecting drilling of at least one hydrocarbon well and/or for detecting hydraulic fracturing of at least one hydrocarbon well, comprising:

a step of selecting at least one specified well location, a step of obtaining at least one time series of top view images of the specified well location, in which each top view image is associated with a date corresponding to a day of acquisition of the top view image, a step of processing the time series of top view images to detect at least one top view image showing the apparition of a well pad and/or showing drilling activity and/or showing fracturing activity, a step of exporting the date corresponding to the day of acquisition of the top view image showing the apparition of the well pad and/or showing drilling activity and/or showing fracturing activity, a step of providing, based on the date having been exported, an information of pad construction date and/or of drilling starting date and/or of fracturing starting date and/or a full production forecast for the specified well location.

According to another aspect of the invention, there is provided a device for detecting pad construction for at least one hydrocarbon well and/or for detecting drilling of at least one hydrocarbon well and/or for detecting hydraulic fracturing of at least one hydrocarbon well, comprising:

a selector module for selecting at least one specified well location, an image production module for obtaining at least one time series of top view images of the specified well location, in which each top view image is associated with a date corresponding to a day of acquisition of the top view image, a processing module for processing the time series of top view images to detect at least one top view image showing the apparition of a well pad and/or showing drilling activity and/or showing hydraulic fracturing, an export module for exporting the date corresponding to the day of acquisition of the top view image showing the apparition of the well pad and/or showing drilling activity and/or showing hydraulic fracturing, an information outputting module for providing, based on the date having been exported, an information of pad construction date and/or of drilling starting date and/or of fracturing starting date and/or a full production forecast for the specified well location.

According to another aspect of the invention, there is provided a permanent storage memory for storing a computer program for detecting pad construction for at least one hydrocarbon well and/or for detecting drilling of at least one hydrocarbon well and/or for detecting hydraulic fracturing of at least one hydrocarbon well, comprising:

instructions of selecting at least one specified well location, instructions of obtaining at least one time series of top view images of the specified well location, in which each top view image is associated with a date corresponding to a day of acquisition of the top view image, instructions of processing the time series of top view images to detect at least one top view image showing the apparition of a well pad and/or showing drilling activity and/or showing hydraulic fracturing, instructions of exporting the date corresponding to the day of acquisition of the top view image showing the apparition of the well pad and/or showing drilling activity and/or showing hydraulic fracturing, instructions of providing, based on the date having been exported, an information of pad construction date and/or of drilling starting date and/or of fracturing starting date and/or a full production forecast for the specified well location.

According to another aspect of the invention, there is provided a method for detecting drilling or hydraulic fracturing of wells, wherein satellite images obtained from different sources are processed to detect and locate well pads and wherein change of activity on a detected well pad is followed using machine learning and/or detection algorithms to detect new drilling or fracturing.

BRIEF DESCRIPTION OF THE DRAWINGS

The invention will be more clearly understood from the following description, given solely by way of non-limiting example in reference to the appended drawings, in which.

DETAILED DESCRIPTION OF THE INVENTION

Figure 1:
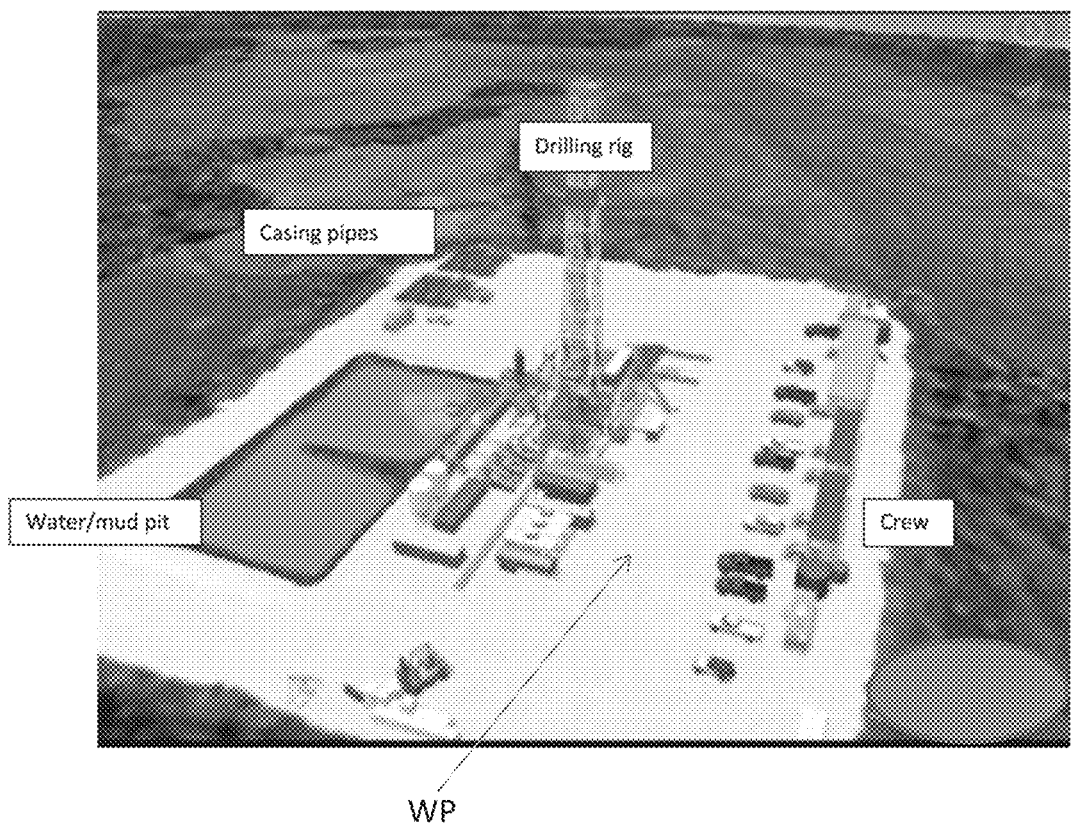
FIG. 1 schematically illustrates an example of a drilling site.

Hereinafter, hydrocarbon wells may be oil wells and/or gas wells. Oil and gas wells share many visible common features. The first one is the well pad WP, as shown on the FIGS. 1, 2, 6A, 6B, 6D, 6E, 7A, 7B, 7C and 15. The well pad WP is a cleared piece of land on which rests the well. The clearing of the land to build a well pad WP always precedes the drilling or the fracking of the well. During drilling, many objects are visible on the well pad WP to perform the drilling. These elements are shown on FIG. 1: a drilling rig, water/mud pit, casing pipes, vehicles of a crew. The well pad WP is a visible bright rectangle of sand.

Figure 2:
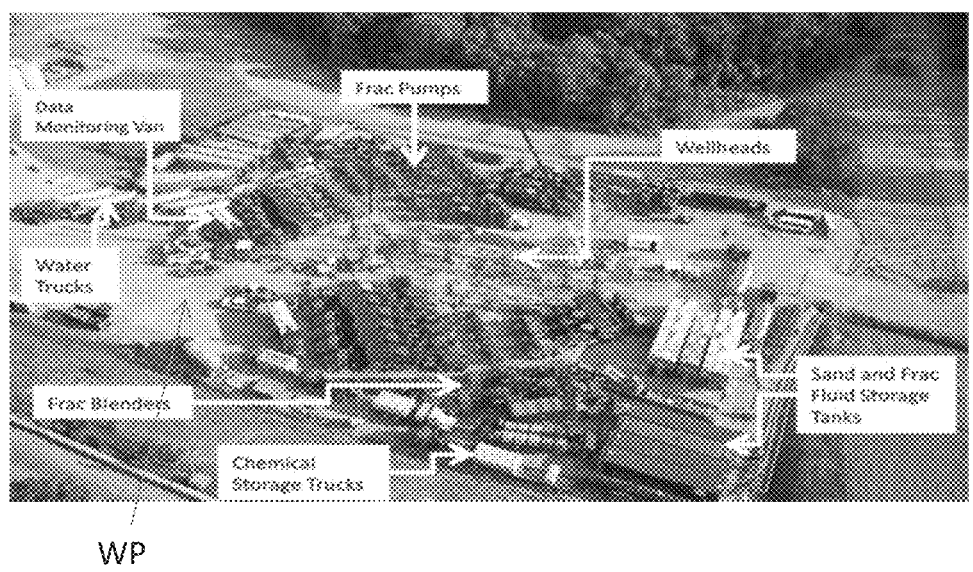
FIG. 2 schematically illustrates an example of a fracking site.

For the fracking procedure, a significant number of trucks and tanks used to store fracturing fluid become visible, as illustrated on FIG. 2, showing frac pumps, wellheads, sand and frac fluid storage tanks, a data monitoring van, water trucks, frac blenders, chemical storage trucks.

Figure 3:
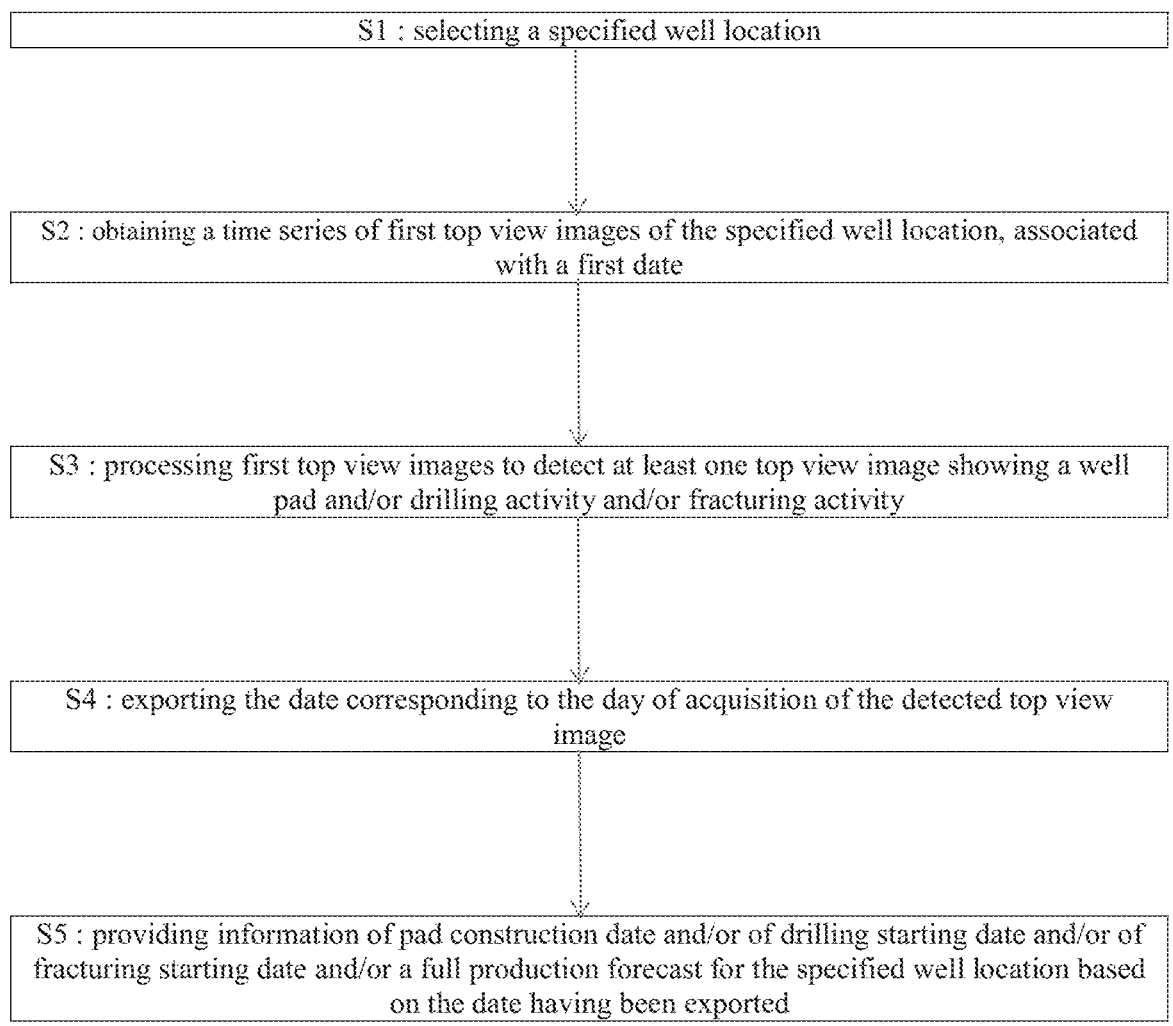
FIG. 3 schematically illustrates an organigram of a method according to an embodiment of the invention.

The method for detecting drilling and/or hydraulic fracturing and/or pad construction of hydrocarbon wells according to the invention is illustrated on FIG. 3. The method provides a first step S1 of selecting at least one specified well location. This may be done in the USA by selecting at least one specified well location from at least one database of drilling permits. Then an updated database of all the current permits that need to be tracked may be constituted. As mentioned above, the first stage in the life of a well is a drilling permit that specifies a location and an expiration date. The operator that owns the permit can drill at any time at this location before the expiration date. Furthermore, in order to test and calibrate the invention, official reports of drilling and fracking activity may be used. As mentioned above, these reports are lagged but they constitute another source of information that may be used to cross-validate the results. Some or all data of the drilling permit, for example the drilling permit date D1 in FIG. 15, may be provided in the information being outputted at step S5.

In a second step S2 following step S1, at least one time series of first top view images of the specified well location, in which each first top view image is associated with a first date corresponding to a day of acquisition of the first top view image, are obtained. For example, each first top view image of the time series is associated with a data which is the day of acquisition of this image. For example, the images and associated dates are obtained from a media, in which the images and the data of day of acquisition are registered. The media may be an external media, which may be a database, a distant server, a website, a distant computer or others. The media may be a local media, such as memory or storage media. The top view images are obtained by an image production module, which may be a computer or any automatic machine, able to download the images and the data of day of acquisition associated therewith from the media. For example, each first top view image of the time series has an identification, such as for example TVI shown on FIG. 15, wherein each identification uniquely identifies the first top view image and is different from the identification the other first top view images. The identification TVI of the first top view image corresponding to the date having been exported may be provided in the information being outputted, as shown on FIG. 15.

The first top view images may be satellite images, aerial images, radar images. The first top view images may be images taken from above the specified well location by an image acquisition device, which may be one or more satellites, using photographic or radar sensors. These top view images may also be aerial images, taken from a plane or a drone, using photographic or radar sensors. The first top view images are also called first images. The use of multiple satellites improves accuracy of the estimation of the pad creation date.

In order to detect drilling or fracking or pad construction, the invention uses the time series of first top view images of a specified well location. For example, the first top view images may be satellite images or earth observation images. The satellite images may come from multiple satellites. As of today, there is a wide range of publically available satellite images. Depending on the satellite and the lens used to take the picture, images have different types of characteristics. Characteristics of satellite images are:

Spatial resolution of the image:

It gives the corresponding length of one pixel in meters. The lower the resolution, the sharper and more visible the image is.

Spectral band (for optical satellites):

It is the wavelength sensitivity of the sensor of the satellite or the colors (light wavelengths) that the sensor of the satellite can record. One satellite often carries multiple bands for each image. Most publically available bands are in the visible and in the near infrared. For example, band 1 of the satellite Landsat 7 captures the wavelength 0.450 to 0.515 μm, which corresponds to the color blue, band 3 the satellite Landsat 8 corresponds to the red band, band 7 of the satellite Landsat 8 corresponds to the near infrared. The bands capture detail about a location differently.

Image file format:

An image is an array where each case corresponds to the value (color) of a pixel. However, the way these image arrays are saved varies with the satellite. The most common type of format is the GEOTIFF file format. This file format used by the satellites Landsat 8 and Sentinel2 enables the user to perform several operations like cropping around geographical area easily. The pixels take values between 0 and $2^{16}$.

Figure 4:
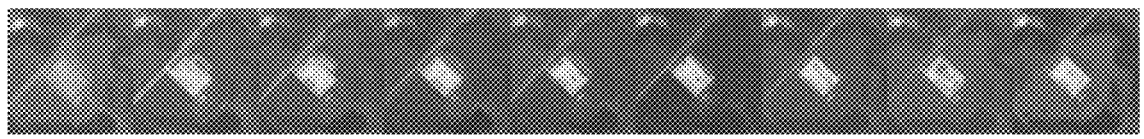
FIG. 4 shows an example of time series of images retrieved from a satellite, FIG. 5 schematically illustrates an organigram of a well pad detection step of the method according to an embodiment of the invention, FIGS. 6A, 6B and 6C schematically illustrate an example of an image processed for well pad detection according to an embodiment of the invention, FIGS. 6D and 6E schematically illustrate an example of an image processed for well pad focusing according to an embodiment of the invention, FIGS. 7A, 7B and 7C schematically illustrate an example of images having been classified according to an embodiment of the invention, FIG. 8 schematically illustrates a Convolutional Neural network which may be used according to an embodiment of the invention, FIG. 9 schematically illustrates an example of two components of images calculated according to an embodiment of the invention, FIG. 10 schematically illustrates an organigram of a possible sub-step of filtering images of the method according to an embodiment of the invention, FIG. 11 schematically illustrates novelty images calculated according to an embodiment of the invention, FIG. 12 schematically illustrates an example of possible ranges of dates for pad appearance, calculated according to an embodiment of the invention, FIG. 13 schematically illustrates an organigram of a method according to another embodiment of the invention, FIG. 14 schematically illustrates a device for detecting drilling and/or hydraulic fracturing of hydrocarbon wells according to an embodiment of the invention, FIG. 15 schematically illustrates an example of an information provided for a well pad location.

The invention may use distant servers for obtaining the first images, for the sourcing of the first images and for the cropping of the first images. Thanks to a pre-computation, it may be accessed later in near real time to all the available images of any location for any band, crop. The invention may use an Application Programming Interface or API for every satellite. These APIs, take as input any location in WSG84 or Latitude/Longitude and return the time series of images for that location. FIG. 4 shows an example of time series of 9 visible images of satellite Sentinel2 after request at the API. The location used is the location of an oil well in Texas. These images are RGB images (Band 2, 3 and 4 combined) display in 8-bits PNG format. The resolution is 10 m.

Figure 10:
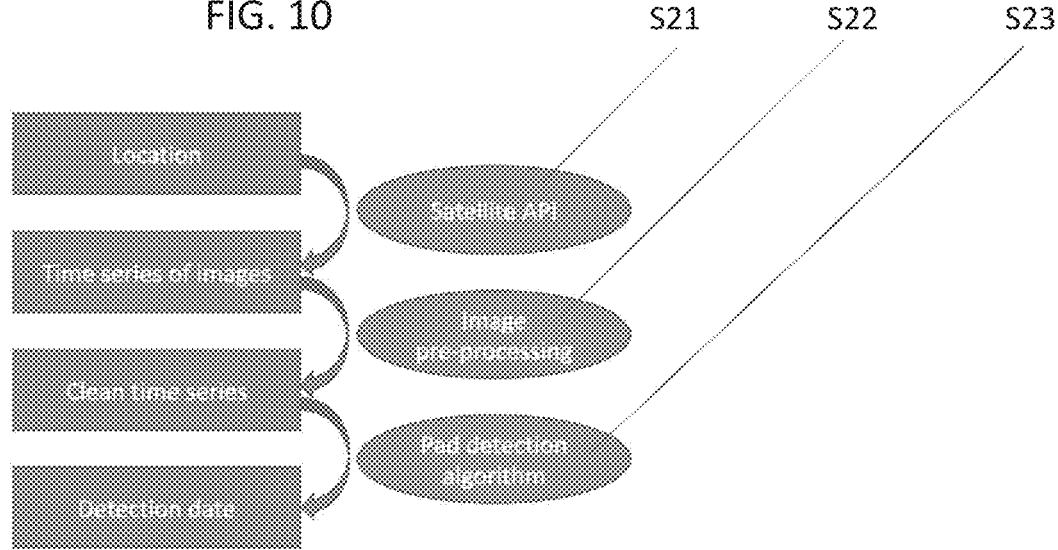

The second step S2 may include a sub-step S22 of removing non-usable first top view images from the time series, made by an image pre-processing module. To detect drilling or fracking activity or pad construction, the invention uses times series of satellite images in several spectral bands. However, the images returned by the API may not all be usable. For optical images for example, some may be completely black and others too cloudy to see anything. An existing open-source toolbox may be used. The goal of the image pre-processing module is mainly to detect which images are covered by clouds and, thus, not usable by the pad detection algorithm. This cloud issue concerns the satellite Landsat-8 and Sentinel2 because of their visible and near-infrared bands. However, it is not an issue for Sentinel1 which has radar images. Sentinel-2 and Landsat-8 images provide their images with cloud masks. For Landsat-8 this information is contained in a special quality band named BQA whereas for Sentinel2, the cloud mask is contained in a separate file. These masks give already a first filtering of clouds. FIG. 10 shows that according to an embodiment of the invention, the step S2 may comprise a sub-step S21 for obtaining by a satellite API a time series of first satellite images for the specified well location. Then, the sub-step S22 of removing non-usable first top view images from the time series (image pre-processing) is carried out on the time series of images. Then, the sub-step S23 determines by an algorithm from the kept first top view images their first date (detection date).

In a third step S3 following step S2, the time series of first top view images are processed to detect at least one top view image showing the apparition of a well pad WP and/or showing drilling activity and/or showing fracturing activity. For example, at least one first top view image of the time series of first top view images is processed to detect a location of a well pad WP. The invention carries out an automatic detection of such apparition in the first images.

In the following operations performed on the time series of first top view images for a given well location, satellite and spectral band are described. The type of algorithms and parameters used may differ depending on the type of satellite or the spectral band. Ultimately, all the activity results by band and satellite may be aggregated to give a general view of the activity at the given location for as many dates as possible. This aggregation of satellites adds significant value as the dates at which each satellite visits the same location differ.

This detection may be performed using image processing and/or machine learning algorithms. Image processing algorithms transforms the way images display objects so that the determining features of activity are easily discernable. Then, machine learning algorithms are trained to detect these features. This step S3 may be carried out by an activity detector of the apparatus.

As mentioned, for a greenfield location, the first sign of activity is the appearance of a well pad WP. Trucks and tanks needed when fracking or drilling are visible on the well pad WP. Thus, it is detected whether or not a well pad is present in the first image by a well pad detection algorithm and, if so, find its location in the first image. The well pad WP is detected and its position is known in step S3. The well pad WP may be detected as being a rectangle or bright rectangle in the first image.

Figure 5:
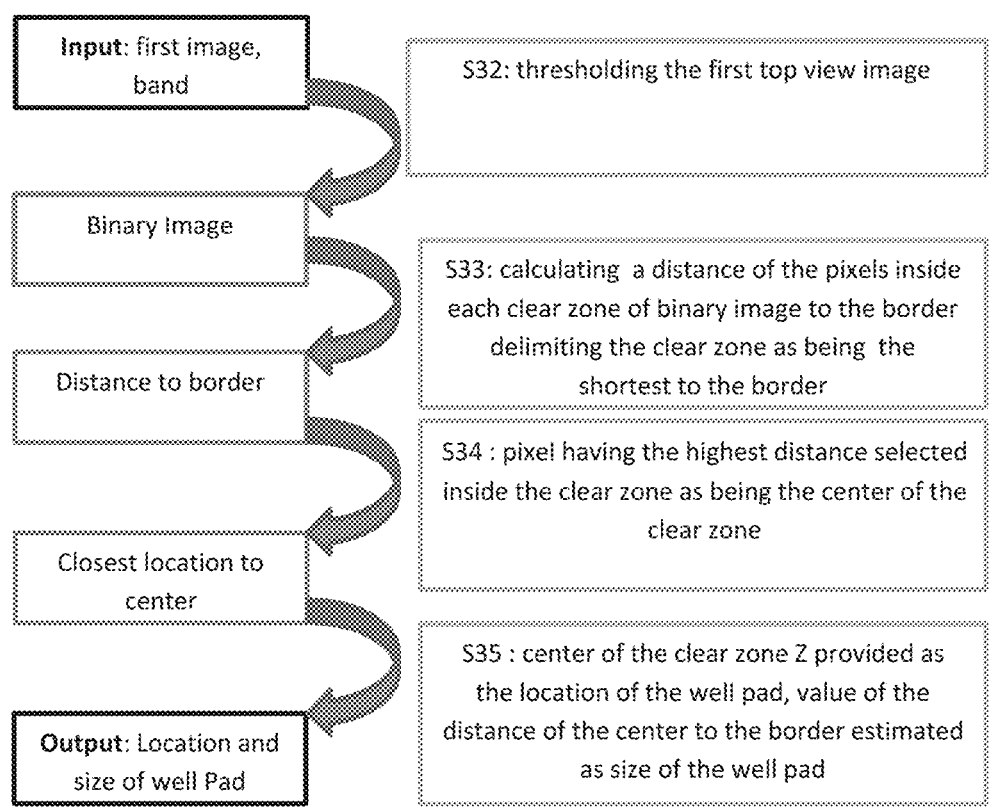

FIG. 5 shows a scheme on how third step S3 may be carried out according to an embodiment of the invention, which is described below in reference to FIGS. 6A, 6B and 6C. FIG. 6A shows an example of a first image obtained by step S2 (in a red band) of one well location display in grayscale color map.

According to this embodiment, step S3 of processing comprises thresholding in sub-step S32 the first top view image, to obtain a binary image having at least one clear zone Z of several contiguous pixels for pixel levels of the first image being above a prescribed threshold. The at least one top view image showing the apparition of a well pad containing the specific well location is selected from the top view images whose binary image has at least one clear zone for pixel levels of the top view image being above the prescribed threshold. The thresholding comprises comparing the intensity (or grey level) of the pixels of the first image to the prescribed threshold. Through the thresholding, every pixel of the first image having an intensity above the threshold will become white in the binary image or will have a first prescribed bright intensity value in the binary image, while every pixel of the first image having an intensity below the threshold will become black in the binary image or with a second prescribed dark intensity value lower than the first prescribed bright intensity value in the binary image. The thresholding of the image for the corresponding band is made to isolate as much cleared land as possible from the background. For example, from image of FIG. 6A, the binary image of FIG. 6B is obtained by sub-step S32.

Then, in sub-step S33, for each pixel inside each clear zone, a distance of the pixel to a border B delimiting the clear zone Z is calculated as being the shortest distance of the pixel to the pixels of the border B. The higher the distance, the more "central" a point is in the clear zone Z.

Then, in sub-step S34, a pixel having the highest distance is selected from the pixels being inside the clear zone Z. This selected pixel is taken as being the center C of the clear zone Z. For a list of pixels, the one that is the closest to the center is found. The center C should correspond to the exact location of the well pad WP.

Then, in sub-step S35, the center C of the clear zone Z is provided as being the location of the well pad WP. The position of that center C and the value of the corresponding distance to the border B is outputted. This value is a good estimation of the well pad size. For example, from image of FIG. 6B, the image of FIG. 6C is obtained by sub-steps S33, S34 and S35. In FIG. 6C, the center C of the well pad WP returned by the algorithm would be the position of the point near the center and the value of the distance is approximately the size of the well pad WP.

In a fourth step S4 following step S3, a step of exporting the date corresponding to the day of acquisition of the top view image having been detected as showing the apparition of the well pad and/or showing drilling activity and/or showing fracturing activity, is carried out. This date may be exported for example by extracting the data of day of acquisition associated with the image, by a computer, or any automatic machine.

In a fifth step S5 following step S4, an information of pad construction date and/or of drilling starting date and/or of fracturing starting date and/or a full production forecast for the specified well location is provided based on the date having been exported. The information may be outputted on an output unit, which may be for example a display screen of a computer, or of a smartphone or any other man-machine interface. FIG. 15 shows an example of an information provided by step S5, in which a permit date D1, a pad construction date D2, a drilling starting date D3, a fracturing starting date D4 and a full production date D5 are outputted in association with a first top view image showing by a sign (here for example a round point) the well pad location WP. Also aggregated geographical data, such as for example an interactive map, may be provided in the information being outputted.

In an embodiment, in the step S3 of processing, first top view images of the time series of first top view images are focused on the location of the well pad WP, to obtain second images focused on the location of the well pad WP. In this case, the first top view images may be optical images. This step may include ignoring the background of the location of the well pad WP in the second images. Knowing exactly where the well pad WP is in the image, it becomes possible to filter the possible changes in the time series and focus on the ones that fall in the zone of interest. This step produces the second images being centered around the location of the well pad WP.

FIG. 6D shows is an example of a first image obtained by step S2 (in an initial RGB band) of one well location display in grayscale color map, similar to FIG. 6A. Using the well pad detection algorithm, the uninteresting background may be removed to keep the well pad WP for the next steps, as shown on FIG. 6E showing the image of FIG. 6D having been processed according to step S3.

The first top view images may be optical images or radar images. In this case, in the step S3 of processing, top view radar image or top view aerial image are focused on the drilling activity and/or fracturing activity, to obtain at least one second image focused on the drilling activity and/or fracturing activity.

In an embodiment, in the fifth step S5 an activity index for each second image may be provided in the information. The activity index may be a number growing with drilling and/or hydraulic fracturing in the second images and is associated with the first date of the first top view image corresponding to the second image.

The processing step S3 may be carried out using a machine learning algorithm and/or a change detection algorithm.

Embodiments of the processing step S3 using machine learning algorithm are described below.

According to an embodiment of the invention, the processing step S3 comprises providing a set of third top view images, which are focused on at least one other location of another well pad and which have been already classified in classes. For example, these set of third top view images may have been manually classified. The comparison step S5 may comprise a classification between two classes, as described below. A machine learning algorithm is used to learn to recognize features of drilling and/or fracking activity, based on the set of third top view images and classes. The features of drilling and/or fracking activity may be trucks and/or tanks on the well pad WP in the second images and third top view images.

According to an embodiment of the invention, the set of third top view images is a training set of images and comprises:
  third top view images being classified in a first class having a first label representative of drilling and/or hydraulic fracturing, and
  other third top view images being classified in a second class having a second label not representative of drilling and/or hydraulic fracturing.

For example, the first label may be "active" or "1", as shown for example in the FIG. 7C, in which the several objects OBJ in the well pad WP are characteristic of fracking and drilling. For example, the second label may be "inactive" or "0", as shown for example in the FIGS. 7A and 7B, in which no object OBJ is present in the well pad WP.

In another example, the first label may be "drilling" or "1", in which the several objects OBJ in the well pad WP are characteristic of drilling. For example, the second label may be "fracking" or "0", in which the several objects OBJ in the well pad WP are characteristic of fracking.

A machine learning algorithm is used for classifying the second images between the first class and the second class, based on at least the third top view images having been classified, to calculate for each second image the activity index of the second image.

According to an embodiment of the invention, the activity index is a real number not lower than zero and not higher than one and which represents a predicted probability $p_i$ that the second image belongs to the first class representative of drilling and/or hydraulic fracturing.

In a variant, the first class may be instead a first class having a first label representative of pad construction and the second class may be a second class having a second label not representative of pad construction, for third top view images focused on at least one other location of drilling activity and/or fracturing activity instead of at least one other location of another well pad.

According to an embodiment of the invention, the machine learning algorithm may comprise using at least one of Histogram of gradients with Linear model, Support Vector Machine, K-Nearest neighbor's algorithm, Random Forests, Support Vector Machine with kernel, Support Vector Machine without kernel, Neural Networks, Convolutional Neural networks.

Figure 8:
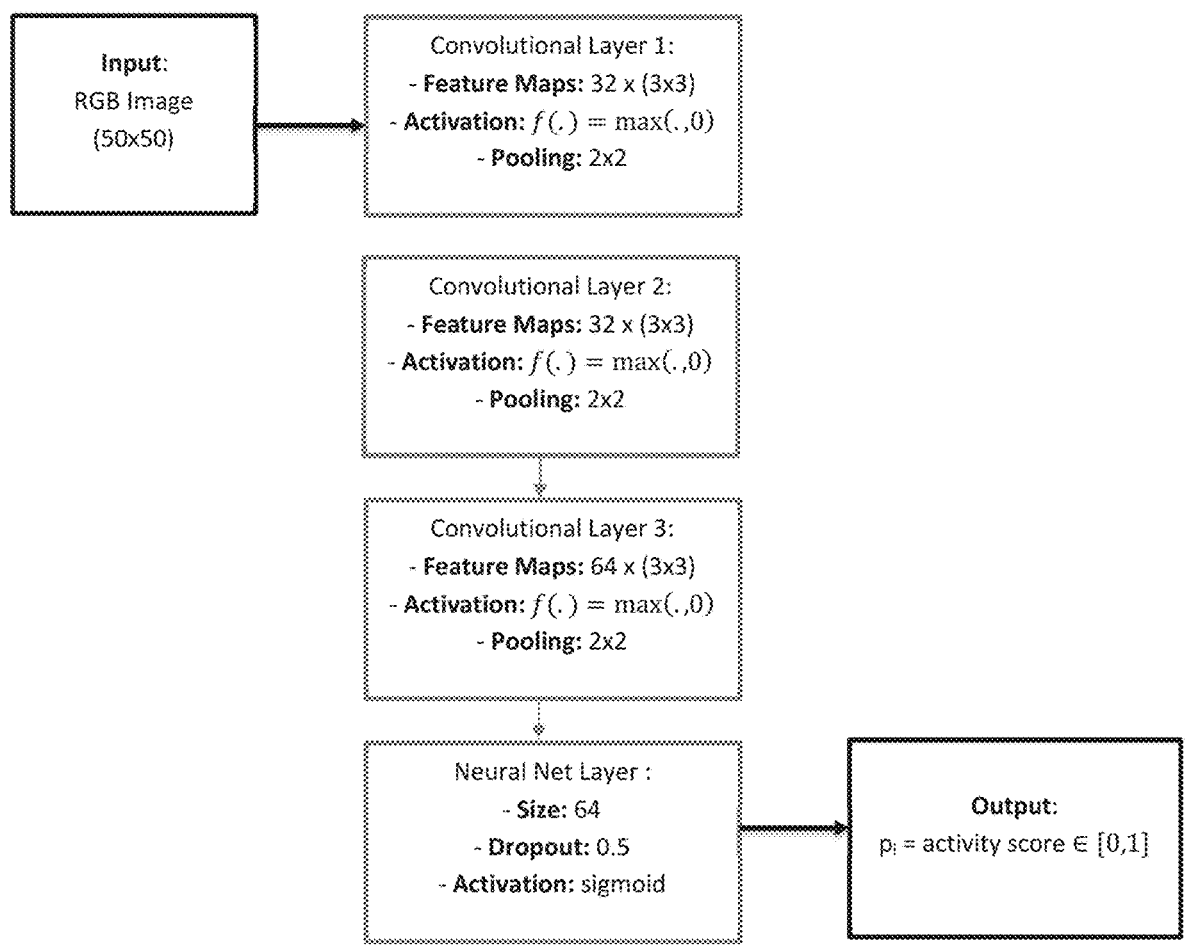

According to an embodiment of the invention, the machine learning algorithm comprises using a Convolutional Neural network to calculate for each second image the activity index of the second image. The Convolutional Neural network may comprise three convolutional layers as shown on FIG. 8, and a neural net layer (fully connected layer). Each convolutional layers may have a pooling of 2×2, and activation being the maximum in view of zero.

According to an embodiment of the invention, the machine learning algorithm comprises training of the Convolutional Neural network to minimize an objective function calculated as $$logloss = -\frac{1}{N}\sum_{i=1}^{N}(y_i\log(p_i) + (1-y_i)\log(1-p_i))$$

where

N is the number of second images, i are indexes of the second images and go from 1 to N, $y_i$ is the label of the second image of index i and is equal to the first label being 1 for the first class and being equal to the second label being 0 for the second class.

According to another embodiment of the invention, the processing step S3 comprises providing a set of third top view images, which are focused on at least one other location of another well pad WP. According to an embodiment of the invention, the processing step S3 may comprise a classification between more than two classes.

For example, the set of third top view images comprises:
third top view images being classified in a first class having a first label representative of drilling and/or hydraulic fracturing,
third top view images being classified in a second class having a second label representative of a presence of the well pad WP,
third top view images being classified in a third class having a third label representative of micro activity spotted, and
third top view images being classified in a fourth class having a fourth label not representative of drilling, hydraulic fracturing, presence of the well pad WP, micro activity spotted.
using a machine learning algorithm, for classifying the second images between the first class, the second class, the third class and the fourth class, based on at least the third top view images being classified.

According to an embodiment of the invention, the machine learning algorithm comprises using a Convolutional Neural network to calculate for each second image the activity index of the second image, which is a real number not lower than zero and not higher than one and which represents a predicted probability $p_{i,k}$ that the second image belongs to the first class, second class, third class and fourth class. According to an embodiment of the invention, the machine learning algorithm comprises training of the Convolutional Neural network to minimize an objective function calculated as $$multiClassLogloss = -\frac{1}{N}\sum_{i=1}^{N}\sum_{k \in Labels} y_{i,k}\log(p_{i,k})$$

where

N is the number of second images, i are indexes of the second images and go from 1 to N, k is a variable designating the first label, second label, third label and fourth label, $y_{i,k}$ is a binary variable indicating if the second image i is of label k.

Once trained and tested, the machine learning algorithm can be used on any new location to analyze the different time series per satellite and, by aggregating the results, an overview of what happened on the given location can be obtained.

According to another embodiment of the invention, the processing step S3 comprises detecting changes representative of pad construction (especially for second images focused on a well pad) and/or drilling and/or hydraulic fracturing in the second images (especially for second images focused on a drilling activity and/or fracturing activity).

The detected change is provided in the information being outputted. Embodiments of the processing step S3 using detecting changes are described below.

The time series of second images may be projected in a space where any unusual event would correspond to activity. This space may be made of several statistical properties of the time series.

According to an embodiment of the invention, the processing step S3 comprises projecting each second image on an histogram calculated for the second images, to detect changes representative of pad construction (especially for second images focused on a well pad) and/or drilling and/or hydraulic fracturing in the second images (especially for second images focused on a drilling activity and/or fracturing activity).

According to another embodiment of the invention, the processing step S3 comprises a dimensionality reduction technique. For example, the processing step S3 comprises using a kernel PCA (principal component analysis) on the cropped time series (second images). For example, the comparison step S5 comprises projecting each second image on an eigenvector calculated from is the covariance matrix of the second images, wherein the activity index of the second images may be the component of the second image along the eigenvector. According to an embodiment of the invention, the comparison step S5 comprises using a principal component analysis, which comprises calculating eigenvalues and eigenvectors of a matrix C, which is the covariance matrix of the second images $x_j$ in a feature space $\Phi(x_j)$, according to $$C = \frac{1}{l}\sum_{j=1}^{l}\phi(x_j)\cdot\phi(x_j)^t$$

where l is the number of second images $x_j$, j is number going from 1 to l, and calculating the activity index from the eigenvalues and the eigenvectors. The activity index is provided in the information being outputted.

Figure 9:
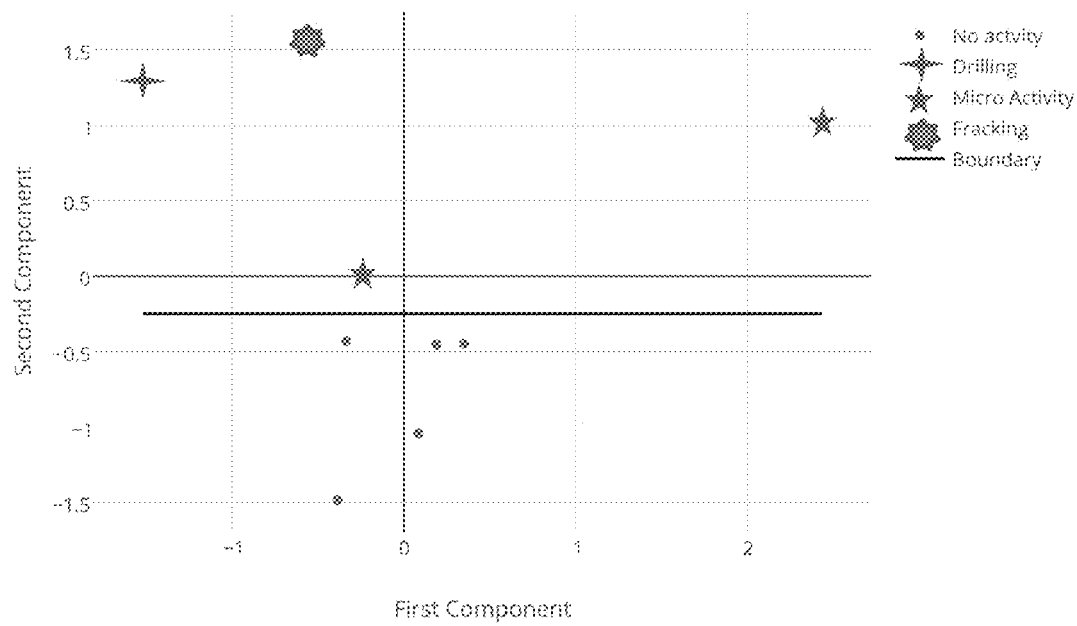

For a time series of cropped images (second images), each second image may be into a 2D space, as shown for example on FIG. 9. On FIG. 9, a separation (illustrated by the boundary line) between the images with activity and the ones with no activity is present. Detecting activity then becomes a simple value test: if the point is above the boundary, there is activity on the well (points indicated as drilling, micro activity and fracking on FIG. 9). The kernel used in FIG. 9 is a 4-degree polynomial kernel with two components.

According to another embodiment of the invention, the processing step S3 comprises detecting changes between the second images in the time series.

According to an embodiment of the invention, the processing step S3 comprises a Novelty features algorithm over the time series of second images in order to find what is new from one image to another and Features engineering over the novelties to define the key characteristics that make a novelty a pad appearance and not a random event, and a Machine learning algorithm trained on the engineered features over a labelled train set. The detected change is provided in the information being outputted.

According to an embodiment of the invention, the processing step S3 comprises:

calculating for each second image Z a set of real numbers $x_i$ in order to $$\underset{x_1,\ldots,x_n \in \mathbb{R}}{\text{minimize}} \left\| Z - \sum_{i=1}^{n} x_i Y_i \right\|^2$$

subject to $x_i \geq 0\, i \in [|1, n|]$, and then calculating for each second image Z a novelty image R according to:

$$R = Z - \sum_{i=1}^{N} x_i^* Y_i$$

where $Y_i$ designates the second images which correspond to a first image associated with a first date being prior to the first date of the first image or images corresponding to the second image Z for i going from 1 to n, $x_i^*$ designates the set of real numbers $x_i$ having been calculated, and calculating the activity index from the novelty images R.

For every given second image, the novelty feature algorithm tries to explain locally what is visible thanks to the available past second images $Y_i$.

Figure 11:
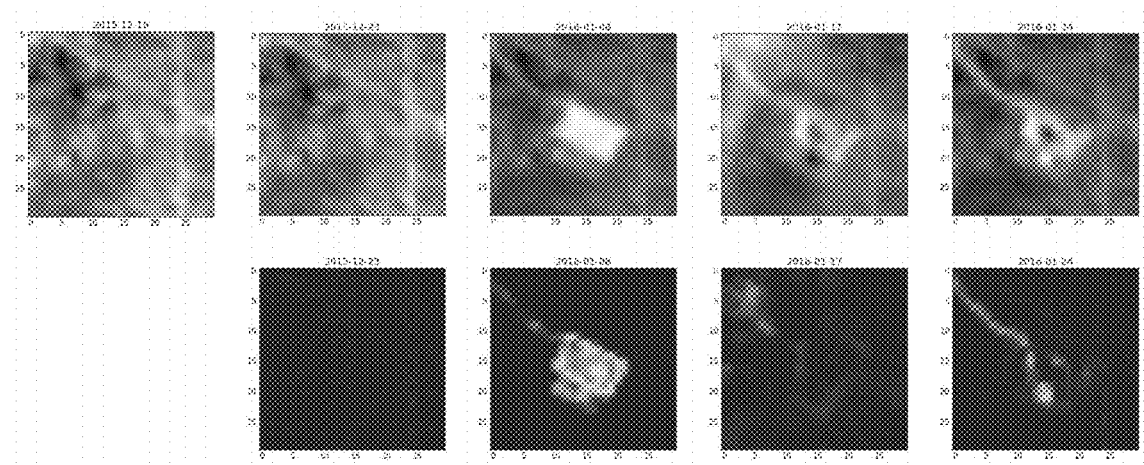

FIG. 11 shows an example of the result of the novelty features algorithm applied on a time series of Landsat-8 band 8 images (second images). The second images are on the upper row and their corresponding novelty images are on the bottom row. For novelty images, new objects compared to the past have a high pixel value. The pad appearance may be seen in the second novelty image. Through the novelty features algorithm, the second images are pre-processed to display novelty in the time series.

Features engineering may comprise extracting specific features that help define what is a pad appearance compared to random event. This may be made based on a prior knowledge of the shape, the placing and the texture of well pads.

A machine learning algorithm similar to the ones mentioned above may be used on the features obtained by the Features engineering.

Figure 12:
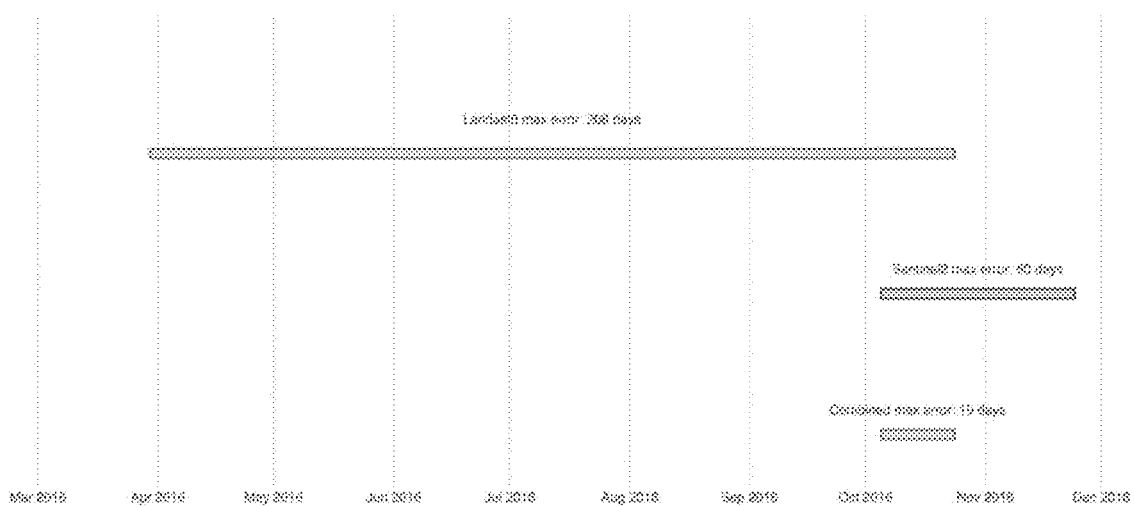

According to an embodiment of the invention, a range of dates indicating pad construction and/or drilling and/or hydraulic fracturing and/or a full production forecast is associated with the information being outputted. For every well pad detected, the actual pad appearance date is in between the detection date and the previous image date in the time series. Since different satellites provide time series of images with different dates, the results of the algorithm may be combined to limit the possible error made, for example as shown in FIG. 12. FIG. 12 shows possible ranges of dates for pad appearance for a permian permit. By combining detection coming from a first satellite (Satellite 1) time series and a second satellite (Satellite 2) time series on FIG. 12, the gap between the previous image and the detection image is reduced to 19 days. The below table 1 shows as an example for FIG. 12 the mean max error possibly made due to the gap between the detection image and the previous image over 1254 pad appearances in the Permian basin.

TABLE 1

| Satellite | Mean max error (days) |
|---|---|
| Satellite 1 | 20.0 |
| Satellite 2 | 27.5 |
| Combined | 12.1 |

According to an embodiment of the invention, the first top view images are drone images. The drone images are aerial images taken by a drone.

In an embodiment, the pad construction/drilling/fracturing date for a specific well obtained through this method can then be used to estimate a first date of production for the well. Using public or proprietary production data of the wells in proximity, geologic data, or other data containing parameters that influence well production, a full production profile for the well can be obtained to forecast production. One example is the time calibration of decline curves according to observed pad construction/drilling/fracturing dates observed through the invention. In order to obtain the first date of production for a specified well, one example is to use historical data of detections through the method and historical production data from public databases. Statistics on this data can give a minimum and average time between drilling/hydraulic fracturing and first production, that can be applied to future detections.

Figure 14:
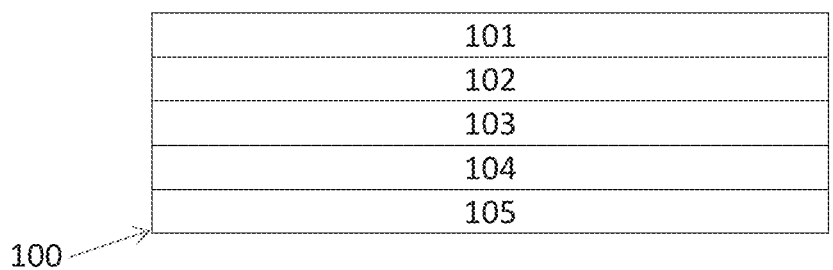

As shown on FIG. 14, the invention provides also a device 100 or apparatus 100 detecting pad construction for at least one hydrocarbon well and/or for detecting drilling of at least one hydrocarbon well and/or for detecting hydraulic fracturing of at least one hydrocarbon well, comprising:

a selector module 101 for selecting at least one specified well location, an image production module 102 for obtaining at least one time series of top view images of the specified well location, in which each top view image is associated with a date corresponding to a day of acquisition of the top view image, a processing module 103 for processing the time series of top view images to detect at least one top view image showing the apparition of a well pad and/or showing drilling activity and/or showing hydraulic fracturing, an export module 104 for exporting the date corresponding to the day of acquisition of the top view image showing the apparition of the well pad and/or showing drilling activity and/or showing hydraulic fracturing, an information outputting module 105 for providing, based on the date having been exported, an information of pad construction date and/or of drilling starting date and/or of fracturing starting date and/or a full production forecast for the specified well location.

The device 100 and the modules 101, 102, 103, 104 and 105 may be embodied by any means, such as for example computers, calculators, processors, microprocessors, permanent memories, servers, databases, computer programs, man-machine interfaces, user interfaces. The device 100 may comprises the above-mentioned means to carry out the steps mentioned above of the method of the invention. A computer program according to the invention may comprise instructions for executing the steps of the method. The computer program may be recorded on any storage media, which may be permanent storage memory or a non-permanent storage memory.

Figure 13:
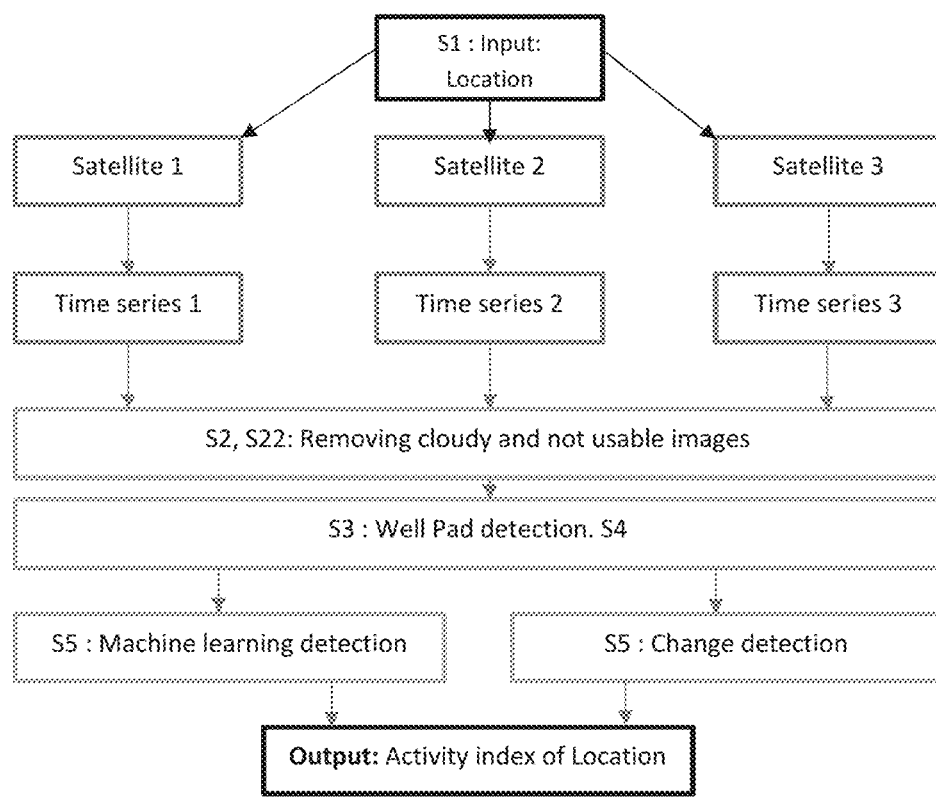

According to an embodiment of the invention, the method uses both one or several of the machine learning approach mentioned below to calculate as activity index a first activity index, and the change detection approach mentioned above to calculate as activity index a second activity index. In this case, a further averaging step may be provided, in which an average of the first activity index and of the second activity index is calculated, as shown for example in FIG. 13. This enables to build a stronger activity index.

The invention enables to build a new well database with a significantly lower lag using satellite images to detect drilling or fracking activity. The invention enables to have for every permit tracked a close to real time view on its pre-drilling/fracking activity. The invention may use free and open source data: free satellite images and open source well permit data. The invention automatically gives a temporal activity index for any given location. The invention considerably reduces the lag of frack and drill reports of wells. The lag of the invention targets at less than a week whereas Texas official databases are more than a year lagged. The up-to-date database has value for oil and gas investors as well as analysts.

Of course, the aspects, embodiments, features and examples of the invention mentioned above may be combined one with another or may be selected independently one from another.

The invention claimed is:

1. A method for detecting at least one of pad construction-drilling, or hydraulic fracturing of at least one hydrocarbon well, comprising:
   selecting at least one specified well location,
   obtaining at least one time series of top view images of the specified well location, in which each top view image is associated with a date corresponding to a day of acquisition of the top view image,
   processing the time series of top view images to detect at least one top view image showing at least one of an apparition of a well pad, drilling activity, or showing fracturing activity,
   exporting the date corresponding to the day of acquisition of the top view image showing the at least one of the apparition of the well pad, the drilling activity, or the fracturing activity, and
   providing, based on the date having been exported, information of at least one of pad construction date, drilling starting date, fracturing starting date, drilling end date, fracturing end date, or a full production forecast for the specified well location,
   wherein the top view images are optical images,
   wherein the processing comprises
      focusing the at least one top view image showing the apparition of the well pad on the well pad having been detected, to obtain at least one second image focused on the well pad
      providing a set of third top view images, which are focused on at least one other location of another well pad and which comprise third top view images being classified in a first class having a first label representative of pad construction and third top view images being classified in a second class having a second label not representative of pad construction, and
      using a machine learning algorithm, for classifying the second images between the first class and the second class, based on at least the third top view images being classified, to calculate for each second image an activity index of the second image, which is a real number not lower than zero and not higher than one and which represents a predicted probability $p_i$ that the second image belongs to the first class, and
   wherein the activity index is associated with the information being provided.

2. The method according to claim 1, wherein the selecting at least one specified well location comprises selecting at least one specified well location from at least one database of drilling permits.

3. The method according to claim 1, wherein the top view images are at least one of satellite images, aerial images, or radar images taken from a satellite.

4. The method according to claim 1, wherein at least one of: (i) data of a drilling permit, (ii) aggregated geographical data, and (iii) an interactive map is associated with the information being provided.

5. The method according to claim 1, wherein the processing comprises detecting the at least one top view image showing the apparition of the well pad as being a top view image having, as the well pad, a rectangle.

6. The method according to claim 1, wherein the processing comprises
   thresholding the top view images in view of pixel levels of the top view image being above a prescribed threshold, to obtain binary images,
   wherein the at least one top view image showing the apparition of the well pad containing the specific well location is selected from the top view images whose binary image has at least one clear zone for pixel levels of the top view image being above the prescribed threshold.

7. The method according to claim 6, wherein the processing comprises
   for each pixel inside each clear zone,
      calculating a distance of the pixel to a border delimiting the clear zone, being the shortest distance of the pixel to the pixels of the border, and
      selecting from the pixels being inside the clear zone a pixel having the highest distance as being a center of the clear zone,
   wherein the center of the clear zone as a location of the well pad is associated with the information being provided.

8. The method according to claim 7, wherein the distance of the center as being an estimation of a size of the well pad is associated with the information being provided.

9. The method according to claim 1, wherein a range of dates indicating at least one of pad construction, drilling, hydraulic fracturing, or a full production forecast is associated with the information being provided.

10. The method according to claim 1, wherein the machine learning algorithm comprises using at least one of:
    a histogram of gradients with a linear model,
    a support vector machine,
    a k-nearest neighbor's algorithm,
    random forests,
    a support vector machine with a kernel,
    a support vector machine without a kernel,
    neural networks, or
    convolutional neural networks.

11. The method according to claim 1, wherein the machine learning algorithm comprises using a convolutional neural network configured to calculate for each second image the activity index of the second image, with training of the convolutional neural network to minimize an objective function calculated as $$logloss = -\frac{1}{N}\sum_{i=1}^{N}(y_i \log(p_i) + (1-y_i)\log(1-p_i))$$

where
N is the number of second images,
i are indexes of the second images and go from 1 to N,
$y_i$ is the label of the second image of index i and is equal to the first label being 1 for the first class and being equal to the second label being 0 for the second class.

12. The method according to claim 1, wherein the processing comprises detecting at least one change representative of pad construction in several second images,
wherein the at least one change having been detected is associated with the information being provided.

13. The method according to claim 1, wherein the processing comprises calculating a histogram for several second images and comparing each of the second images to the histogram, to detect at least one change representative of pad construction in the second images,
wherein the at least one change having been detected is associated with the information being provided.

14. The method according to claim 1, wherein the processing comprises:
using a principal component analysis, which comprises calculating eigenvalues and eigenvectors of a matrix C, which is the covariance matrix of several second images $x_j$ in a feature space $\Phi(x_j)$, according to $$C = \frac{1}{l}\sum_{j=1}^{l}\phi(x_j)\cdot\phi(x_j)^t$$

where
l is the number of second images $x_j$, and
j is number going from 1 to l, and
calculating an activity index from the eigenvalues and the eigenvectors,
wherein the activity index is associated with the information being provided.

15. The method according to claim 1, wherein the processing comprises detecting at least one change between several second images in the time series,
wherein the at least one change having been detected is associated with the information being provided.

16. A device for detecting at least one of pad construction, drilling, or hydraulic fracturing of at least one hydrocarbon well, the device comprising:
a processor operably coupled to a memory and configured to:
select at least one specified well location,
obtain at least one time series of top view images of the specified well location, in which each top view image is associated with a date corresponding to a day of acquisition of the top view image,
process the time series of top view images to detect at least one top view image showing at least one of an apparition of a well pad, drilling activity, or hydraulic fracturing,
focus the at least one top view image showing the apparition of the well pad on the well pad having been detected, to obtain at least one second image focused on the well pad, wherein the top view images are optical images,
provide a set of third top view images, which are focused on at least one other location of another well pad and which comprise third top view images being classified in a first class having a first label representative of pad construction and third top view images being classified in a second class having a second label not representative of pad construction,
use a machine learning algorithm, for classifying the second images between the first class and the second class, based on at least the third top view images being classified, to calculate for each second image an activity index of the second image, which is a real number not lower than zero and not higher than one and which represents a predicted probability $p_i$ that the second image belongs to the first class,
export the date corresponding to the day of acquisition of the top view image showing the at least one of the apparition of the well pad, the drilling activity, or the hydraulic fracturing, and
provide, based on the date having been exported, at least one of information of pad construction date, drilling starting date, fracturing starting date, or a full production forecast for the specified well location,
wherein the activity index is associated with the information being provided.

17. A non-transitory computer-readable storage medium having instructions stored thereon that, when executed by a processor, cause the processor to execute operations for detecting at least one of pad construction, drilling, or hydraulic fracturing of at least one hydrocarbon well, the operations comprising:
selecting at least one specified well location,
obtaining at least one time series of top view images of the specified well location, in which each top view image is associated with a date corresponding to a day of acquisition of the top view image,
processing the time series of top view images to detect at least one top view image showing at least one of an apparition of a well pad, drilling activity, or hydraulic fracturing,
exporting the date corresponding to the day of acquisition of the top view image showing the at least one of the apparition of the well pad, the drilling activity, or the hydraulic fracturing,
providing, based on the date having been exported, information of at least one of pad construction date, drilling starting date, fracturing starting date, or a full production forecast for the specified well location,
wherein the top view images are optical images,
wherein the processing comprises
focusing the at least one top view image showing the apparition of the well pad on the well pad having been detected, to obtain at least one second image focused on the well pad,
providing a set of third top view images, which are focused on at least one other location of another well pad and which comprise third top view images being classified in a first class having a first label representative of pad construction and third top view images being classified in a second class having a second label not representative of pad construction, and
using a machine learning algorithm, for classifying the second images between the first class and the second class, based on at least the third top view images being classified, to calculate for each second image an activity index of the second image, which is a real number not lower than zero and not higher than one and which represents a predicted probability $p_i$ that the second image belongs to the first class, and wherein the activity index is associated with the information being provided.

18. A method for detecting at least one of pad construction-drilling, or hydraulic fracturing of at least one hydrocarbon well, comprising:

selecting at least one specified well location, obtaining at least one time series of top view images of the specified well location, in which each top view image is associated with a date corresponding to a day of acquisition of the top view image, processing the time series of top view images to detect at least one top view image showing at least one of an apparition of a well pad, drilling activity, or showing fracturing activity, exporting the date corresponding to the day of acquisition of the top view image showing the at least one of the apparition of the well pad, the drilling activity, or the fracturing activity, and providing, based on the date having been exported, information of at least one of pad construction date, drilling starting date, fracturing starting date, or a full production forecast for the specified well location, wherein the top view images are optical images or radar images, and wherein the processing comprises focusing the at least one top view radar image or top view aerial image showing the apparition of at least one of drilling activity or fracturing activity, to obtain at least one second image focused on the at least one of the drilling activity or the fracturing activity, providing a set of third top view images, which are focused on at least one other location of at least one of drilling activity or fracturing activity and which comprise third top view images being classified in a first class having a first label representative of at least one of drilling or hydraulic fracturing and third top view images being classified in a second class having a second label not representative of the at least one of the drilling or the hydraulic fracturing, and using a machine learning algorithm, for classifying the second images between the first class and the second class, based on at least the third top view images being classified, to calculate for each second image an activity index of the second image, which is a real number not lower than zero and not higher than one and which represents a predicted probability $p_i$ that the second image belongs to the first class, and wherein the activity index is associated with the information being provided.

19. The method according to claim 18, wherein the machine learning algorithm comprises using at least one of:

a histogram of gradients with a linear model,
a support vector machine,
a k-nearest neighbor's algorithm,
random forests,
a support vector machine with a kernel,
a support vector machine without a kernel,
neural networks, or
convolutional neural networks.

20. The method according to claim 18, wherein the machine learning algorithm comprises using a convolutional neural network configured to calculate for each second image the activity index of the second image, with training of the convolutional neural network to minimize an objective function calculated as $$logloss = -\frac{1}{N}\sum_{i=1}^{N}(y_i \log(p_i) + (1 - y_i)\log(1 - p_i))$$

where
N is the number of second images,
i are indexes of the second images and go from 1 to N,
$y_i$ is the label of the second image of index i and is equal to the first label being 1 for the first class and being equal to the second label being 0 for the second class.

21. The method according to claim 18, wherein the processing comprises detecting at least one change representative of at least one of drilling or hydraulic fracturing in several second images, wherein the at least one change having been detected is associated with the information being provided.

22. The method according to claim 18, wherein the processing comprises projecting each second image on a histogram calculated for several second images, to detect at least one change representative of at least one of drilling or hydraulic fracturing in the second images, wherein the at least one change having been detected is associated with the information being provided.

23. The method according to claim 18, wherein the processing comprises:

using a principal component analysis, which comprises calculating eigenvalues and eigenvectors of a matrix C, which is the covariance matrix of several second images $x_j$ in a feature space $\Phi(x_j)$, according to $$C = \frac{1}{l}\sum_{j=1}^{l}\phi(x_j) \cdot \phi(x_j)^t$$

where
l is the number of second images $x_j$, and
j is number going from 1 to l, and
calculating an activity index from the eigenvalues and the eigenvectors,
wherein the activity index is associated with the information being provided.

24. The method according to claim 18, wherein the processing comprises detecting at least one change between several second images in the time series, wherein the at least one change having been detected is associated with the information being provided.

25. A device for detecting at least one of pad construction, drilling, or hydraulic fracturing of at least one hydrocarbon well, the device comprising:

a processor operably coupled to a memory and configured to:

select at least one specified well location, obtain at least one time series of top view images of the specified well location, in which each top view image is associated with a date corresponding to a day of acquisition of the top view image, wherein the top view images are optical images or radar images, and process the time series of top view images to detect at least one top view image showing at least one of an apparition of a well pad, drilling activity, or hydraulic fracturing, wherein the processing comprises
focusing the at least one top view radar image or top view aerial image showing the apparition of at least one of drilling activity or fracturing activity, to obtain at least one second image focused on the at least one of the drilling activity or the fracturing activity providing a set of third top view images, which are focused on at least one other location of at least one of drilling activity or fracturing activity and which comprise third top view images being classified in a first class having a first label representative of at least one of drilling or hydraulic fracturing and third top view images being classified in a second class having a second label not representative of the at least one of the drilling or the hydraulic fracturing, and using a machine learning algorithm, for classifying the second images between the first class and the second class, based on at least the third top view images being classified, to calculate for each second image an activity index of the second image, which is a real number not lower than zero and not higher than one and which represents a predicted probability $p_i$ that the second image belongs to the first class, and wherein the activity index is associated with the information being provided.

26. A non-transitory computer-readable storage medium having instructions stored thereon that, when executed by a processor, cause the processor to execute operations for detecting at least one of pad construction, drilling, or hydraulic fracturing of at least one hydrocarbon well, the operations comprising:

selecting at least one specified well location, obtaining at least one time series of top view images of the specified well location, in which each top view image is associated with a date corresponding to a day of acquisition of the top view image, processing the time series of top view images to detect at least one top view image showing at least one of an apparition of a well pad, drilling activity, or hydraulic fracturing, exporting the date corresponding to the day of acquisition of the top view image showing the at least one of the apparition of the well pad, the drilling activity, or the hydraulic fracturing, and providing, based on the date having been exported, information of at least one of pad construction date, drilling starting date, fracturing starting date, or a full production forecast for the specified well location, wherein the top view images are optical images or radar images, wherein the processing comprises
focusing the at least one top view radar image or top view aerial image showing the apparition of at least one of drilling activity or fracturing activity, to obtain at least one second image focused on the at least one of the drilling activity or the fracturing activity, providing a set of third top view images, which are focused on at least one other location of at least one of drilling activity or fracturing activity and which comprise third top view images being classified in a first class having a first label representative of at least one of drilling or hydraulic fracturing and third top view images being classified in a second class having a second label not representative of the at least one of the drilling or the hydraulic fracturing, and using a machine learning algorithm, for classifying the second images between the first class and the second class, based on at least the third top view images being classified, to calculate for each second image an activity index of the second image, which is a real number not lower than zero and not higher than one and which represents a predicted probability $p_i$ that the second image belongs to the first class, and wherein the activity index is associated with the information being provided.

* * * * *